Figure 1:
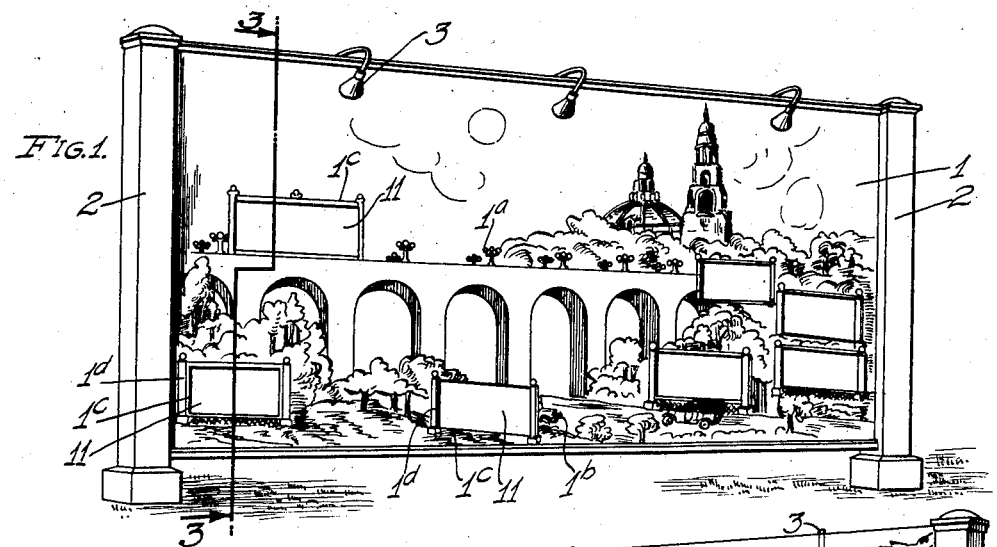

April 1, 1930.  T. J. McCLEAVE  1,752,919
ADVERTISING APPARATUS
Filed June 26, 1926

INVENTOR.
THOMAS J. McCLEAVE.
BY A. B. Bowman
ATTORNEY

Patented Apr. 1, 1930

1,752,919

UNITED STATES PATENT OFFICE

THOMAS J. McCLEAVE, OF SAN DIEGO, CALIFORNIA

ADVERTISING APPARATUS

Application filed June 26, 1926. Serial No. 118,711.

My invention relates to advertising apparatus adapted for interior and outside advertising of various classes.

The objects of my invention are: first, to provide advertising apparatus or means having special and attractive scenic displays of various characters whereby the eye of the public is attracted and which has in combination with the scenic display advertising material arranged therein and novelly and effectively illuminated, whereby the eye of the public is further attracted to the advertising apparatus or means and particularly to the advertising matter thereon; second, to provide advertising apparatus or means of this class in which the special and attractive scenic display is illuminated from the front side by variously colored reflected lights so as to effectively bring out the scene displayed for attracting the eye of the public; third, to provide advertising apparatus or means of this class in which advertising matter in the form of miniature billboards or signboards is arranged in natural order in and on the scene displayed, said advertising matter being mounted, painted, imprinted or otherwise inscribed on translucent or partially translucent material adapted to be illuminated from the back side of the apparatus; fourth, to provide an advertising apparatus of this class having a scenic display in which are openings covered by a translucent or partially translucent material on which advertising matter is displayed, said advertising matter being made to stand out from the scene by illumination from the back side of the apparatus; fifth, to provide an advertising apparatus of this class in which the various advertising matter variously arranged relative to the scenic display may be variously, independently and intermittently illuminated to more effectively attract the attention of the public; sixth, to provide an advertising apparatus of this class whereby the advertising matter, variously arranged on the scenic display, may be easily removed and changed as desired; seventh, to provide advertising apparatus of this class which may be adapted for outside advertising, such as billboards, signboards and the like, as well as for interior advertising such as on theater curtains, ferry buildings, railway stations, boats, trains, show windows and the like; eighth, to provide advertising apparatus of this class in which the light thrown on the translucent screens, or other means on which advertising matter is portrayed in connection with a scenic display, is evenly and effectively distributed; ninth, to provide as a whole a novelly constructed and arranged advertising apparatus, and tenth, to provide apparatus or means of this class which is simple and economical of construction and operation and which will not readily deteriorate or get out of order.

Figure 2:
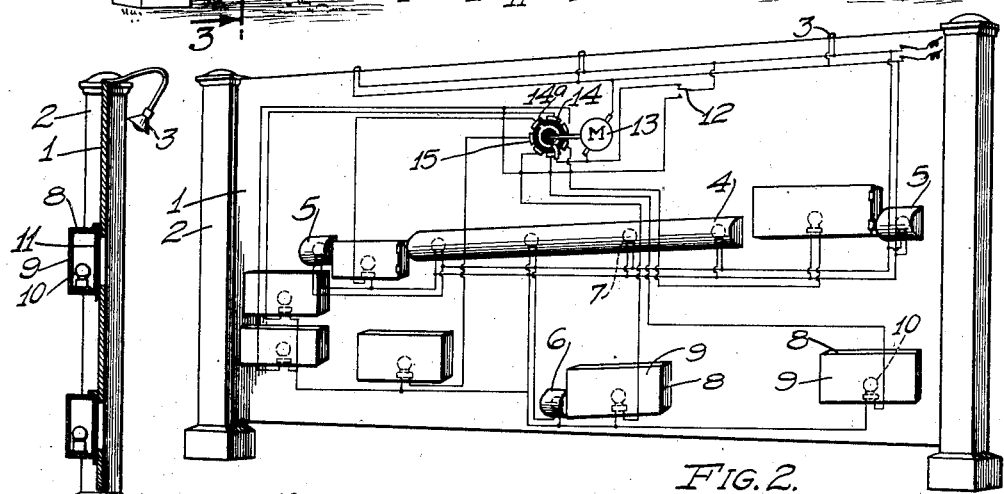
Figure 3:
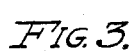
Figure 4:
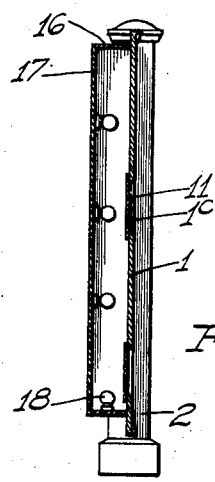

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a front perspective view of a bill board incorporating my invention; Fig. 2 is a perspective view showing the back side thereof and also showing the wiring diagram for illuminating the several portions thereof; Fig. 3 is a sectional view thereof, taken through 3—3 of Fig. 1, and Fig. 4 is a sectional view similar to that shown in Fig. 3 of a slightly modified form of construction of a billboard incorporating my invention.

Like characters of reference refer to similar parts and portions throughout the several views of the drawings.

The billboard shown in the drawings consists of a board, panel or screen 1 supported in an upright position in any suitable manner, such as by columns 2, at its ends. At the front side of the board, panel or screen is painted, drawn or otherwise applied an artistic scene, so portrayed in color or otherwise as to readily attract the attention of the public. To make the painting, drawing or otherwise applied scenic display stand out more effectively, I have provided colored electric lighting effects at the upper portion of the front side of the panel 1. These lighting effects or means consist preferably of lights 3 of various colors and directed toward the scenic display by reflectors, as shown. The scene on the panel 1 shows a bridge having boulevard lights, indicated by 1ª, and also lights 1ᵇ on an automobile shown on a road in the scene. In the board, panel or screen 1 are provided openings which represent the lights 1ª and 1ᵇ. At the back side of the panel 1 and opposite the openings forming the lights 1ª and 1ᵇ is provided illuminating means, which consists of light reflecting cabinets 4, 5 and 6 in which are placed electric bulbs 7. The illuminating means for the lights 1ª and 1ᵇ may be variously divided up so that the same does not interfere with other illuminating means at the back side of the panel, as shown best in Fig. 2. The cabinet 4 is shown extending a considerable distance across the back side of the panel for illuminating a number of the lights or openings 1ª, representing the boulevard lights on the bridge.

In the board, panel or screen 1 are provided openings 1ᶜ, which are preferably surrounded by designs 1ᵈ, said openings and surrounding designs representing miniature billboards or signboards. Said billboard or signboard representations are arranged in natural order in the scene along the roadside and background therein, as shown. At the back side of the board, panel or screen and behind each of the openings 1ᶜ are provided illuminating cabinets 8, which are supported on the member 1 in any convenient manner. Said cabinets are provided at their back sides with reflecting surfaces 9, which may be in the form of painted boards, sheet metal, white fabric, porcelain, glass or the like, and may be in the form of doors for said cabinets. In each of the cabinets are positioned electric bulbs 10 for illuminating the same and for transmitting direct and reflected light toward the openings 1ᶜ. Over the openings 1ᶜ and preferably at the back side of the panel 1 are placed translucent, or partially translucent, screens 11, on which are painted, drawn or otherwise inscribed advertising matter, which may be readily seen through the openings and prominently brought out by the illumination from the illuminating cabinet at the back side of the panel. Said translucent screens 11, on which the advertising matter is applied, may be in the form of parchment, fabric, glass or the like and placed directly against the back side of the panel 1. Said translucent screens 11 may be mounted in frames which may be readily inserted through slots at the upper sides of the cabinets 8 so that said advertising screens or members may be readily removed and replaced by others when desiring to change the advertising.

In the wiring diagram in Fig. 2 is shown a switch 12 for directly connecting all of the electric bulbs in the several illuminating cabinets 8 to a source of electrical energy, whereby all of the cabinets are simultaneously illuminated, or for connecting the electrical energy to a timing and intermittent switch mechanism, whereby the several cabinets 8 are illuminated separately and in sequence. The switch mechanism is operated by an electric motor 13 connected with a source of energy and controlled by the switch 12. Said motor is operatively connected with a contact carrying drum 14, which may be provided with one or more contacts at its periphery, as indicated by 14ª in Fig. 2. Said contact 14ª is adapted to engage arcuate contacts 15 arranged around the drum, one contact 15 being connected with the electric bulbs in each of the illuminating cabinets 8. Thus the advertising matter over the several openings 1ᶜ of the panel or screen is independently illuminated and in sequence, such sequence having no particular order. The bulbs in the cabinets 4, 5 and 6 are preferably continuously lighted when desiring to display the advertising apparatus, the same being particularly illuminated at night.

In the modified form of construction shown in Fig. 4 of the drawings a large illuminating cabinet 16 is shown at the back side of the panel or screen 1 instead of the large number of separate and smaller cabinets. The cabinet 16, constructed in any suitable manner, is provided with a back wall, which may be made of wood, sheet metal, fabric or the like, which is adapted to reflect the light from the electric bulbs 18 outwardly through the openings 1ᶜ and through the translucent advertising screens placed over the openings. In this manner all advertising screens and all openings made in the board, panel or screen on which the scene is painted are illuminated at all times when the lights are on.

When the apparatus shown and described is used in connection with theater curtains and other indoor advertising, the panel or screen 1 is preferably made partially translucent to more effectively bring out the colors and contrast in the scene, particularly in the sky or moon.

Though I have shown and described a particular construction, combination and arrangement of parts and portions and a certain modification thereof, I do not wish to be limited to this particular construction, combination and arrangement nor to the modification, but desire to include in the scope of my invention the construction, combination and arrangement substantially as set forth in the appended claims.

Having thus described my invention, what I claim as new and desire to secure by Letters Patent is:

1. In an advertising apparatus of the class described, a scenic display having readily replaceable light emitting portions arranged therein, certain of said light emitting portions having separate and independent advertising matter arranged therein, illuminating compartments arranged at the back side of said scenic display behind the light emitting portions having said advertising matter, means for variously, independently, and intermittently illuminating said compartments for particular advertising purposes, and other illuminating compartments arranged at the back side of said scenic display behind the other light emitting portions, said other illuminating compartments having permanent sources of light for generally attracting the attention of individuals to the advertising apparatus.

2. In an advertising apparatus of the class described, a scenic display having readily replaceable light emitting advertising portions arranged therein, an illuminating compartment arranged at the back side of said scenic display behind each of said light emitting portions, and means for variously, independently, and intermittently illuminating said compartments.

In testimony whereof, I have hereunto set my hand at San Diego, California, this 11th day of June, 1926.

THOMAS J. McCLEAVE.